F. BOEHME.
ANIMAL MUZZLE.
APPLICATION FILED OCT. 15, 1915.

1,170,400.

Patented Feb. 1, 1916.

Witness
M. E. Laughlin.

Inventor
Frank Boehme,
By Victor J. Evans
Attorney

UNITED STATES PATENT OFFICE.

FRANK BOEHME, OF NEW YORK, N. Y.

ANIMAL-MUZZLE.

1,170,400.  Specification of Letters Patent.  Patented Feb. 1, 1916.

Application filed October 15, 1915.  Serial No. 56,098.

*To all whom it may concern:*

Be it known that I, FRANK BOEHME, a citizen of the United States, residing at New York city, in the county of New York and State of New York, have invented new and useful Improvements in Animal-Muzzles, of which the following is a specification.

This invention relates to muzzles especially adapted to be used on dogs or similar animals and it consists in the novel features hereinafter described and claimed.

An object of the invention is to provide a muzzle of simple and durable structure having means for securely holding the same in position upon the head of an animal.

Another object of the invention is to provide in a muzzle of the character indicated, sanitary features or elements which will prevent the muzzle from accumulating filth, as for instance saliva and the like.

With these objects in view the muzzle comprises a wire frame having the wires at their points of intersection covered with soft material, as rubber, whereby the joints are closed and concealed and the said coverings serve as pads for preventing the muzzle from wearing the hair from the head of the animal or bruising or scarring the skin.

Figure 1:
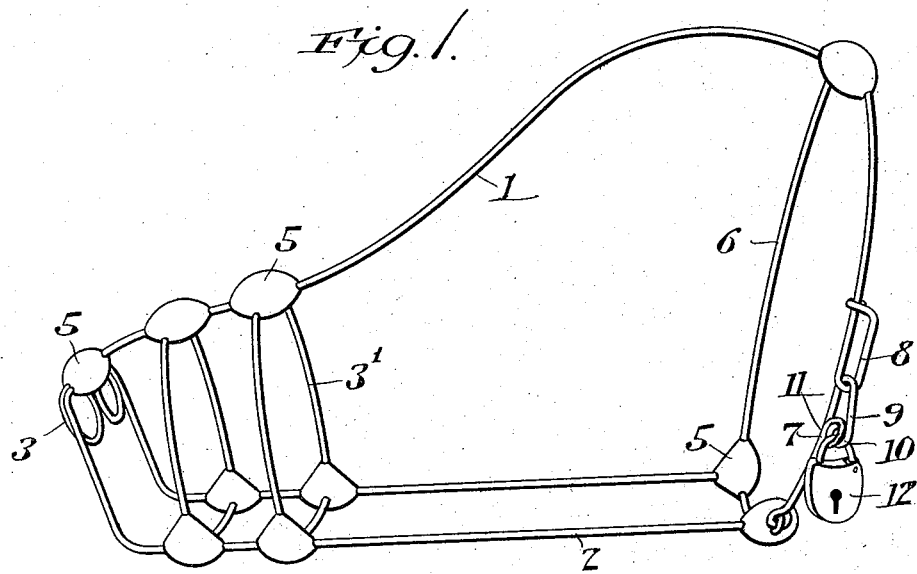
Figure 2:
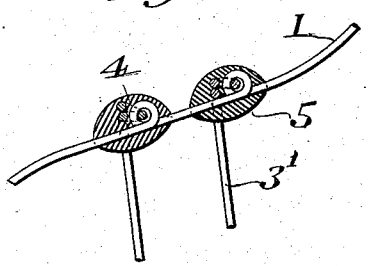

In the accompanying drawing:—Figure 1 is a perspective view of the muzzle. Fig. 2 is a detail sectional view of part of the muzzle.

The muzzle comprises a top wire 1 which is connected at its forward end with the front and bottom wires 2. Loops 3 are provided in the wires 2 at the forward end of the muzzle and may lie in front of the nostrils of the animal when the muzzle is in position upon the head. Interlocking coils 4 (see Fig. 2 of the drawing) are provided, which securely hold the wires 3' in position with relation to the wires 1 and 2. The wires 1 and 3' and 2 and 3' at their points of intersection are covered by bodies of rubber or other suitable soft material. The point of connection between the wire 1 and the wires 2 at the forward end of the muzzle is also covered by a similar body 5. At the rear ends of the wires 1 and 2 a wire section 6 is secured, and the joints or points of connection between the section 6 and the wires 1 and 2 are also covered by bodies 5. A wire section 7 is pivotally connected with one end of the wire section 6, and the section 6 is provided at its other end with a loop 8. The wire section 7 is provided at its free end with a hook 9 adapted to pass through the loop 8, whereby the sections 7 and 8 are secured together and constitute a band adapted to surround the neck of the animal when the muzzle is applied. The hook 9 is provided at its bill or free end with an eye 10 which may be brought into register with an eye 11 formed upon the wire section 7, and when these eyes are brought together the bail of a lock 12 may be passed through the said eyes, whereby the section 7 is securely held in engagement with the section 6.

From the above description taken in conjunction with the accompanying drawing it will be seen that a muzzle of light and durable structure is provided, and inasmuch as no leather or similar material is used in the structure and the points of intersection of the various wires are covered by soft bodies, the muzzle is of a sanitary character and cannot accumulate objectionable foreign matter, as for instance saliva. Furthermore, the bodies 5 serve as cushions and permit the muzzle to rest comfortably upon the head of the animal and prevent the wires from coming in contact with the hair or skin.

Having described the invention what is claimed is:—

A muzzle comprising a wire structure having at its rear ends loop wire sections one of which is provided with a slot and the other provided with a hook, said hook having at its free end an eye, the section carrying the hook having an eye adapted to register with the eye upon the hook whereby the said eyes may receive the bail of a lock.

In testimony whereof I affix my signature in presence of a witness.

FRANK BOEHME.

Witness:
  GEO. A. BYRNE.

Copies of this patent may be obtained for five cents each, by addressing the "Commissioner of Patents, Washington, D. C."